(12) United States Patent
Lim (10) Patent No.: US 10,904,163 B2
(45) Date of Patent: Jan. 26, 2021

(54) TUNNELING DATA TO A DATA-PATH CHIP VIA A MICROCONTROLLER UNIT (MCU)

(71) Applicant: Lumentum Operations LLC, Milpitas, CA (US)

(72) Inventor: Hock Gin Lim, San Jose, CA (US)

(73) Assignee: Lumentum Operations LLC, San Jose, CA (US)

( * ) Notice: Subject to any disclaimer, the term of this patent is extended or adjusted under 35 U.S.C. 154(b) by 0 days.

(21) Appl. No.: 16/362,320

(22) Filed: Mar. 22, 2019

(65) Prior Publication Data

US 2019/0306081 A1 Oct. 3, 2019

Related U.S. Application Data

(60) Provisional application No. 62/649,363, filed on Mar. 28, 2018.

(51) Int. Cl.
| | |
|---|---|
| *H04L 12/911* | (2013.01) |
| *G06F 13/42* | (2006.01) |
| *G06F 9/54* | (2006.01) |
| *H04B 10/40* | (2013.01) |
| *H04L 12/24* | (2006.01) |
| *G06F 13/40* | (2006.01) |

(52) U.S. Cl.
CPC .......... *H04L 47/825* (2013.01); *G06F 9/541* (2013.01); *G06F 13/4004* (2013.01); *G06F 13/4286* (2013.01); *H04B 10/40* (2013.01); *H04L 41/08* (2013.01); *G06F 2213/0002* (2013.01); *G06F 2213/0016* (2013.01)

(58) Field of Classification Search
CPC .. G06F 9/541; G06F 13/4286; G06F 13/4004; G06F 13/4027; G06F 2213/0002; G06F 2213/0016; H04L 47/825; H04L 41/08; H04L 41/0803; H04B 10/40
See application file for complete search history.

(56) References Cited

U.S. PATENT DOCUMENTS

| | | | |
|---|---|---|---|
| 2005/0185463 A1* | 8/2005 | Kanamori | G11C 16/20 365/185.04 |
| 2008/0140981 A1* | 6/2008 | Kim | G06F 9/54 711/171 |
| 2008/0159191 A1* | 7/2008 | Wang | H04W 8/005 370/310 |
| 2010/0067539 A1* | 3/2010 | Lin | H04L 49/9063 370/419 |
| 2011/0130163 A1* | 6/2011 | Saban | H04W 88/085 455/517 |
| 2014/0254384 A1* | 9/2014 | Ginzboorg | H04L 61/6022 370/235.1 |
| 2015/0254088 A1* | 9/2015 | Chou | G06F 3/061 709/212 |
| 2017/0295058 A1* | 10/2017 | Gottschalk | H04L 12/2807 |

* cited by examiner

*Primary Examiner* — Thomas J. Cleary
(74) *Attorney, Agent, or Firm* — Harrity & Harrity, LLP (57) ABSTRACT

A system may comprise a host device that stores a first application programming interface (API) and a transceiver. The transceiver may comprise a microcontroller unit (MCU) that stores a second API. The second API may be a subset of the first API. The first API and the second API may control different functions of a data-path chip of the transceiver. The MCU may be configured to provide controls and data from the first API through the MCU without operating on the controls and the data and without using the second API.

20 Claims, 4 Drawing Sheets

TUNNELING DATA TO A DATA-PATH CHIP VIA A MICROCONTROLLER UNIT (MCU)

RELATED APPLICATION

This application claims priority under 35 U.S.C. § 119 to U.S. Provisional Patent Application No. 62/649,363, filed on Mar. 28, 2018, the content of which is incorporated by reference herein in its entirety.

TECHNICAL FIELD

The present disclosure relates to tunneling data and, more particularly, to tunneling data to a data-path chip via a microcontroller unit (MCU).

BACKGROUND

A transceiver is a device that includes a transmitter and a receiver. The transmitter and the receiver of a transceiver may share common circuitry or may have separate circuitry. A transceiver may include various components, such as a microcontroller unit (MCU), a data-path chip, and/or the like.

SUMMARY

According to some implementations, a method may comprise: receiving, by a microcontroller unit (MCU) of a transceiver and from a host device, a first set of messages associated with providing control instructions to the MCU, wherein the first set of messages is associated with, and received via, an external communications interface between the MCU and the host device; receiving, by the MCU and from the host device, a second set of messages associated with controlling a first set of functions of a data-path chip of the transceiver, wherein the first set of functions is associated with a first portion of an application programming interface (API) compiled on the host device, wherein the second set of messages includes data associated with, and to be provided via, an internal communications interface between the MCU and the data-path chip; and providing, by the MCU and to the data-path chip, the data via the internal communications interface to control one or more of the first set of functions of the data-path chip.

According to some implementations, a transceiver may comprise: a set of connectors; an MCU; and a data-path chip, wherein the MCU and a device are connected via an external communications interface associated with the set of connectors, wherein the MCU and the data-path chip are connected via an internal communications interface that is different than the external communications interface, wherein a first portion of an API associated with controlling first functions of the data-path chip is compiled on the device, wherein the first portion of the API is different than a second portion of the API that is associated with controlling second functions of the data-path chip and that is compiled on the MCU, wherein the MCU is configured to: receive, on the external communications interface and from the device, a set of messages associated with the external communications interface, wherein the set of messages includes data associated with the internal communications interface and with controlling the second functions of the data-path chip; and provide, to the data-path chip and via the internal communications interface, the data to control the second functions after receiving the set of messages.

According to some implementations, a system may comprise a host device that stores a first API; and a transceiver comprising an MCU that stores a second API, wherein the second API is a subset of the first API, wherein the first API and the second API control different functions of a data-path chip of the transceiver, wherein the MCU is configured to provide controls and data from the first API through the MCU without operating on the controls and the data and without using the second API.

According to some implementations, a host device may comprise: one or more memories; and one or more processors, communicatively coupled to the one or more memories, to: provide, via an external communications interface between the host device and a transceiver, a first set of messages to an MCU of the transceiver, wherein the first set of messages is associated with providing control instructions to the MCU; and provide, via the external communications interface and after providing the first set of messages, a second set of messages to the MCU, wherein the second set of messages includes data to be provided to a data-path chip of the transceiver by the MCU via an internal communications interface between the MCU and the data-path chip, wherein the second set of messages is associated with controlling a set of functions of the data-path chip with which the host device is connected, wherein the set of functions is associated with a portion of an application programming interface (API) compiled on the host device.

According to some implementations, a method may comprise: receiving, by an MCU and from a host device, a first set of messages and a second set of messages associated with controlling a first set of functions of a data-path chip of a transceiver, wherein the first set of functions is associated with a first portion of an API compiled on the host device, wherein the first set of functions is different than a second set of functions of the data-path chip associated with a second portion of the API compiled on the MCU, wherein the second set of messages includes data associated with, and to be provided via, an internal communications interface between the MCU and the data-path chip; and providing, by the MCU and to the data-path chip, the data in the second set of messages via the internal communications interface to control one or more of the first set of functions of the data-path chip.

DETAILED DESCRIPTION

The following detailed description of example implementations refers to the accompanying drawings. The same reference numbers in different drawings may identify the same or similar elements.

A transceiver may include various components, such as a set of physical connectors, a microcontroller unit (MCU), a data-path chip, and/or the like. In some contexts, the MCU stores an application programming interface (API) associated with controlling functions of the data-path chip. As MCUs and data-path chips increase in complexity (e.g., due to an increase in the number and complexity of functions that a transceiver is expected to perform) memory resources have become limited with regard to the MCU. This includes causing a memory shortage on the MCU with regard to APIs stored on the MCUs. Eventually, a transceiver may lack sufficient memory resources on an MCU to store an API associated with controlling the data-path chip. In addition, based on an API being compiled on the MCU, the MCU has to convert all commands received from a host device into a set of API calls that are forwarded to the data-path chip. This consumes processing resources of the MCU, introduces latency into causing the data-path chip to perform an action, and/or the like.

Some implementations described herein provide a transceiver that includes an MCU and a data-path chip, where an API (or a first portion thereof) associated with controlling operations of the data-path chip is compiled on a host device that is external to the transceiver and a subset of the API (or a second portion of the API) is compiled on the MCU. For example, the API and the subset of the API may be associated with controlling different functions of the data-path chip. In addition, the transceiver may be configured to tunnel messages associated with functions of the API (or the first portion) from the host device to the data-path chip without performing operations on the messages based on the API (or the first portion) being compiled on the host device. In this way, at least a portion of an API used to control a data-path chip of a transceiver is offloaded to an external host device. This conserves memory resources of an MCU by reducing an amount of data related to the API that the MCU has to store. In addition, this conserves processing resources of the transceiver by reducing or eliminating a quantity of operations that the MCU needs to perform on incoming messages (e.g., the messages associated with the portion of the API compiled on the host device are tunneled to the data-path chip without further operations, such as converting commands from the host device into API calls that are forwarded to the data-path chip). Further, reducing or eliminating a need for the MCU to perform operations on incoming messages reduces or eliminates latency that would otherwise be created when causing the data-path chip to perform an action. Further, reducing or eliminating a need for the MCU to perform operations on incoming messages reduces the power dissipation of the transceiver.

Figure 1:
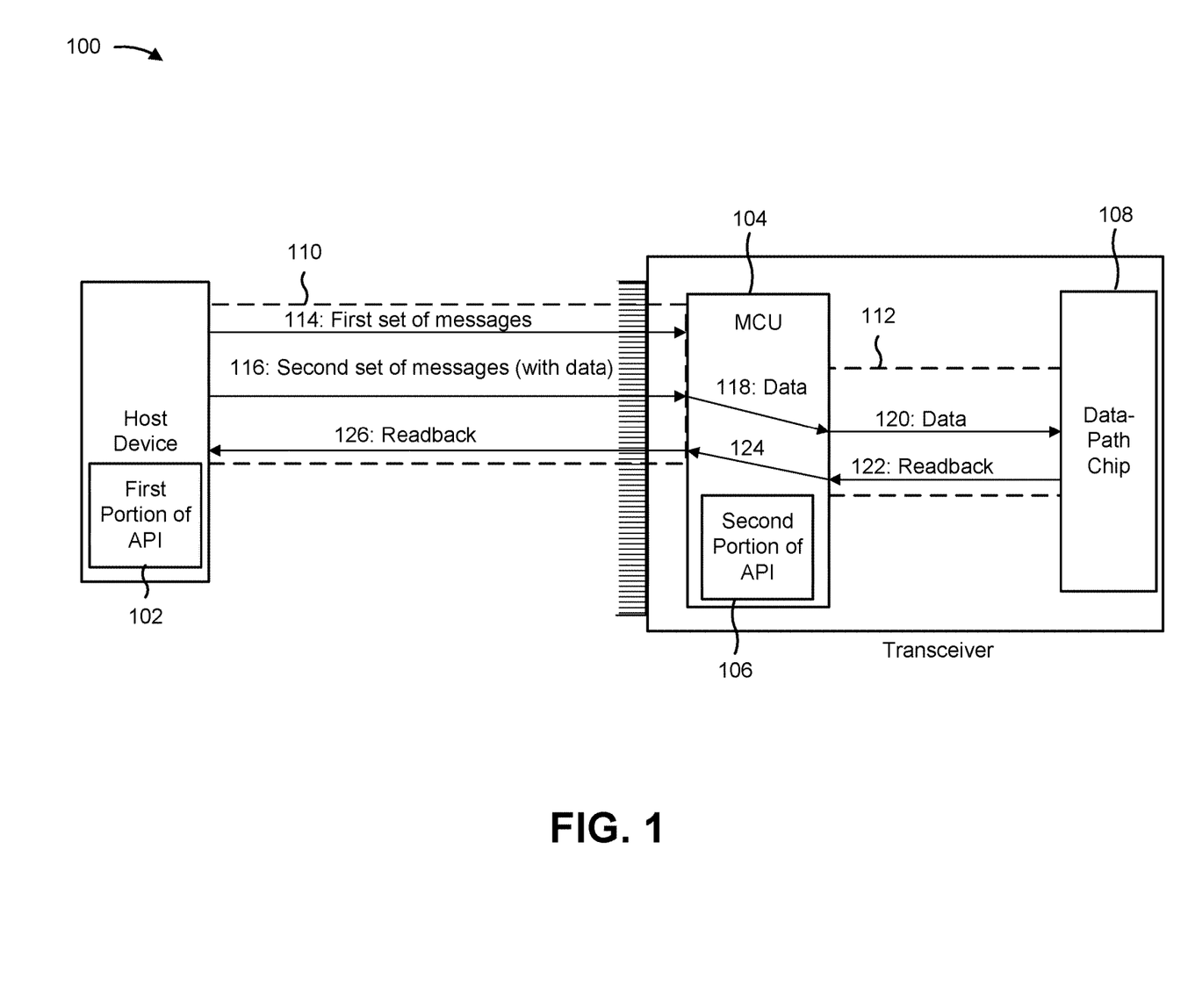
FIG. 1 is a diagram of an overview of an example implementation described herein.

FIG. 1 is a diagram of an example implementation 100 described herein. As shown in FIG. 1, implementation 100 includes a host device (e.g., a client device, a server device, and/or the like) and a transceiver (e.g., an electrical transceiver and/or an optical transceiver). The host device and the transceiver may be connected via a set of connectors (e.g., a set of physical connectors) of the transceiver and a corresponding socket of the host device.

As shown in FIG. 1, and by reference number 102, the host device may store a first portion of an API. For example, the first portion of the API may be compiled on the host device. The first portion of the API may be a full API (e.g., may include all portions of an API). The first portion of the API may be associated with a first set of functions of a data-path chip of the transceiver (shown by reference number 108). For example, API calls associated with the first portion of the API may control the first set of functions of the data-path chip. The first set of functions of the data-path chip may include calibration functions, debugging functions, configuration functions, and/or the like that the transceiver does not regularly need when deployed in the field, or that are typically used by a technician in a lab setting, for example.

As shown by reference number 104, the transceiver may include an MCU. For example, the MCU may be connected to the set of connectors (e.g., a subset of the set of connectors) and to the data-path chip of the transceiver (shown by reference number 108). As shown by reference number 106, the MCU may store, in memory, a second portion of the API described above. For example, the second portion of the API may be associated with a second set of functions of the data-path chip. For example, the second set of functions may be different functions than the first set of functions associated with the first portion of the API, and the second portion of the API may be associated with controlling the second set of functions. In some implementations, the second set of functions of the data-path chip may include error-handling functions, data processing functions, and/or the like that the transceiver may need to use when deployed in the field. In the case where the first portion of the API includes the full API, the second portion of the API may include a subset of the full API.

As described above, and as shown by reference number 108, the transceiver may include a data-path chip. For example, the data-path chip may be connected to the MCU. In addition, the data-path chip may be connected directly to a subset of the set of connectors of the transceiver. As described elsewhere herein, the data-path chip may receive data from the host device via the MCU without the MCU performing operations on the data.

As shown by reference number 110, the host device and the transceiver may be connected via an external communications interface. For example, the external communications interface may be a physical wire interface, such as a single wire interface or a multi-wire interface (e.g., a two-wire interface). The external communications interface may connect the host device and the transceiver via the set of connectors for data transfer between the host device and the transceiver. As shown by reference number 112, the MCU and the data-path chip may be connected via an internal communications interface. For example, the internal communications interface may be a physical wire interface, such as a serial peripheral interface (SPI), an inter-integrated circuit (I2C) interface, a management data input/output (MDIO) interface, and/or the like. In some implementations, the external communications interface and the internal communications interface may be the same physical wire interface, but may be associated with different protocols. For example, the external communications interface and the internal communications interface may be the same physical wire interface, but the external communications interface may be a two-wire interface, and the internal communications interface may be an SPI, an I2C interface, an MDIO interface, a two-wire interface, and/or the like.

As shown by reference number 114, the host device may send, to the MCU of the transceiver, a first set of messages. For example, the host device may send the first set of messages to the MCU via the external communications interface and via the set of connectors.

The first set of messages may be associated with providing control instructions to the MCU. For example, the first set of messages may be associated with writing a control page for the data to the MCU, with writing a control structure for the data to the MCU, and/or the like. Continuing with the previous example, the first set of messages may be associated with writing a control page number to a particular register of the MCU, with writing a control structure that includes a message length of each of a second set of messages (described below), with identifying a message mode of the second set of messages (e.g., whether the second set of messages includes data formatted for an SPI, an MDIO interface, an I2C interface, and/or the like), with identifying a checksum of the data to be included in the second set of messages, and/or the like. Additionally, or alternatively, the first set of messages may include information related to confirming the validity of the first set of messages. For example, the first set of messages may include an identifier for the host device that sent the first set of messages.

As a specific example related to writing 256 bytes of data to the data-path chip, where the external communications interface is an I2C interface and the internal communications interface is an SPI, the first set of messages may include an I2C write message to write a control page number to register 127 of the MCU. In addition, and continuing with the specific example, the first set of messages may include an I2C write message to write the control structure to registers 128 through 255 of the MCU.

In some implementations, the first set of messages may include data similar to that described below. For example, the first set of messages may include data that is to be sent to the data-path chip via the internal communications interface in a manner similar to that described below.

As shown in FIG. 1 by reference number 116, the host device may send a second set of messages to the MCU via the external communications interface. For example, the host device may send the second set of messages after sending the first set of messages, after receiving an acknowledgement of the first set of messages from the transceiver, based on a request from the transceiver for the first set of messages, and/or the like. The second set of messages may include a set of write messages (e.g., to write data to the data-path chip). The second set of messages may include data that is to be provided via the internal communications interface to the data-path chip (e.g., data that is to be tunneled through the MCU to the data-path chip). For example, the data may be associated with the same protocol as the internal communications interface (e.g., may be SPI data, MDIO data, I2C data, and/or the like depending on whether the internal communications interface is an SPI, an MDIO interface, an I2C interface, and/or the like). As a specific example, if the internal communications interface is an SPI, the data may be SPI data. Additionally, or alternatively, the data may be associated with controlling the first functions of the data-path chip (e.g., may include a set of commands to control the first functions associated with the first portion of the API stored by the host device).

The second set of messages may include a message associated with indicating an upcoming data transfer and with writing a data page to the data-path chip. For example, the message may be associated with writing a data page to a particular register of the data-path chip. Referring to the specific example related to transferring 256 bytes of data to the data-path chip described above, the message may include an I2C write message associated with writing a data page to register 127 of the data-path chip. Additionally, or alternatively, the second set of messages may include a message that includes data to be transferred to the data-path chip. For example, the message may include data to be written to a particular register of the data-path chip. Referring to the specific example related to transferring 256 bytes of data to the data-path chip described above, the first set of messages may include an I2C message associated with writing SPI data to registers 128 through 255 of the data-path chip and that includes the SPI data to be written.

In some implementations, the second set of messages may include multiple pairs of messages associated with writing data pages and data to various registers of the data-path chip. For example, and referring to the specific example related to transferring 256 bytes of data to the data-path chip described above, the first set of messages may include a first I2C message to write a first data page to register 127, a second I2C message to write first SPI data to registers 128 through 255 (e.g., to write byte 0 through byte 127), a third I2C message to write a second data page to register 127, and a fourth I2C message to write second SPI data to registers 128 through 255 (e.g., to write byte 128 through byte 255). In the previous example, the first through fourth I2C messages resulted in 256 bytes of data being written to the data-path chip to control actions of the data-path chip. In this way, the host device may send, to the MCU, a second set of messages associated with writing data to the data-path chip set.

In some implementations, the second set of messages may not include one or more messages related to writing corresponding data pages to the data-path chip. For example, the second set of messages may not include the first I2C message associated with writing the first data page or the third I2C message associated with writing the second data page described above. In this case, the MCU may detect receipt of a message, in a first set of messages, associated with writing a control structure and may automatically change the register value for a data page (e.g., may change the register value to register 127 for a first data page). Continuing with the previous case, the MCU may receive the second I2C message of the second set of messages described above and may count the quantity of bytes transferred in the second I2C message (e.g., 128 bytes in the above specific example). After counting a threshold quantity of bytes (e.g., 128 bytes in the above specific example), the MCU may change the register value to a register for a second data page. After changing the register value, the MCU may receive the fourth I2C message of the second set of messages described above and may count the quantity of bytes received with the fourth message in a manner similar to that described with regard to the second I2C message. After counting a threshold quantity of bytes (e.g., 128 bytes in the above specific example), the MCU may determine that data writing from the host device is complete and may change the register value to prepare for readback of data to the host device. This provides an automated way for the MCU to stream data from the host device to the data-path chip without a need for the MCU to perform operations on the data prior to providing the data to the data-path chip.

As shown in FIG. 1 by reference number 118, the MCU may provide data included in the second set of messages to the internal communications interface to provide the data to the data-path chip. For example, the MCU may provide the data to the internal communications interface without performing operations on the data based on receiving the data in a set of write messages as the second set of messages. In this case, the set of write messages may cause the MCU to write the data to the internal communications interface. This reduces or eliminates a need for the MCU to perform a conversion of a set of instructions from the host device to a set of API calls, thereby conserving processing resources of the MCU, reducing or eliminating latency associated with causing the data-path chip to perform an action that would otherwise occur as a result of having to convert the set of instructions to the set of API calls, and/or the like. As shown by reference number 120, the data may travel via the internal communications interface to the data-path chip. For example, the data may travel via the internal communications interface based on the MCU writing the data to the internal communications interface.

In some implementations, the MCU may disable the second portion of the API when providing the data to the data-path chip. For example, the MCU may prevent the second portion of the API from being called by the host device while the data is being provided to the data-path chip. This reduces or eliminates interruptions, interference, and/or the like to the transfer of data to the data-path chip that could otherwise occur if the second portion of the API was not disabled.

In some implementations, and as shown by reference numbers 122 through 126, the data-path chip and the MCU may perform a readback of the data provided to the data-path chip to the host device (e.g., after the MCU has completed providing the data to the data-path chip). For example, the MCU may receive a readback of the data from the data-path chip and may send a third set of messages to the host device that includes the readback of the data. Continuing with the previous example, the third set of messages may include various messages to write corresponding data pages to the host device, various messages to perform the readback of the data, and/or the like. Referring to the specific example related to transferring 256 bytes of data to the data-path chip described above, the MCU may send a third set of messages comprising a first I2C write message to the host device to write a first data page to register 127 of the host device and may send a first read message to the host device to read data associated with registers 128 through 255 (e.g., byte 0 through byte 127) of the data-path chip to the host device. The MCU may send additional pairs of messages to the host device until a threshold amount of data has been read back to the host device. For example, the third set of messages may include a third I2C message to write a second data page to the host device and a fourth I2C message to write byte 128 through byte 255 to the host device (e.g., to read back a total of 256 bytes of data to the host device between the first through fourth messages). In some implementations, rather than including the first I2C message and the third I2C message in the third set of messages, the MCU may count the number (quantity) of bytes read back to the host device and may change the register value for the data page in a manner similar to that described elsewhere herein.

In some implementations, rather than performing a readback of the data, the data-path chip may provide other data stored by the data-path chip to the host device via the tunnel path through the MCU. For example, the data may identify configurations of the data-path chip associated with the second portion of the API, may include values for operating parameters gathered by the data-path chip during operation of the transceiver, and/or the like. In this case, the host device may request the data via the sets of messages described herein.

In some implementations, providing control instructions to the data-path chip, providing data to the data-path chip, and/or performing a readback of the data may be performed in a different manner than that described above. For example, and using I2C messages and SPI data as an example, the MCU may receive an I2C write message associated with writing a data page to register 255 of the data-path chip (e.g., rather than register 127 described above). Continuing with the previous example, the MCU may receive an I2C message associated with writing control information to the data page and with identifying that data to be received is to be written to registers 128 through 255 of the data-path chip. In some implementations, the MCU may automatically change registers and/or data pages in a manner similar to that described above. After receiving the I2C message associated with writing control information, the MCU may write SPI data, for example, with a prescribed length (e.g., up to 128 bytes). The MCU may continue writing SPI data in this manner in bursts of up to the prescribed length. In some implementations, the MCU may write to a register associated with a data page between writes of SPI data, such as for buffering. This facilitates pausing of writing of SPI data so that other registers may be accessed for other purposes. In some implementations, after writing the SPI data, the MCU may perform a readback in a manner similar to that described elsewhere herein.

In this way, implementations described herein provide a way to tunnel data through an MCU of a transceiver to a data-path chip of the transceiver (e.g., within a two-wire interface management interface) by providing a way for commands to be sent via the MCU to the data-path chip without the MCU having to convert the commands into a set of API calls (e.g., the MCU may be configured to provide controls and data from a first API, which is external to the MCU, through the MCU without operating on the controls and the data and without using a second API stored on the MCU). This facilitates off-loading of portions of an API to a host device from the MCU, thereby conserving memory resources of the MCU by reducing or eliminating a need for the MCU to store the portions of the API, to store a communications library associated with the API, and/or the like. In addition, this conserves processing resources of the MCU by reducing or eliminating operations that the MCU has to perform on commands from the host device. Further, this provides a way to conserve memory and/or processing resources of the MCU, as described above, without additional or different hardware or components for the MCU. Further, this facilitates a reduction in size of the MCU needed for the transceiver, which can reduce or conserve costs associated with producing the transceiver, can create free space within a housing of the transceiver for other components, and/or the like. Further, this reduces the power dissipation of the transceiver. Further, implementations described herein can operate independently of a protocol of an internal communications interface and can be adapted to various serial or parallel protocols, thereby improving functioning of the transceiver.

As indicated above, FIG. 1 is provided merely as an example. Other examples may differ from what is described with regard to FIG. 1. For example, although FIG. 1 is described in the context of the host device initiating communications between the host device and the data-path chip, the data-path chip may initiate communications with the host device. In this case, the data-path chip may send a request to the host device to notify the host device that the data-path chip has data that is ready to be sent to the host device. Continuing with the previous case, the host device may then send various sets of messages similar to that described herein to cause the data-path chip to send the data to the host device via the tunnel path through the MCU.

Figure 2:
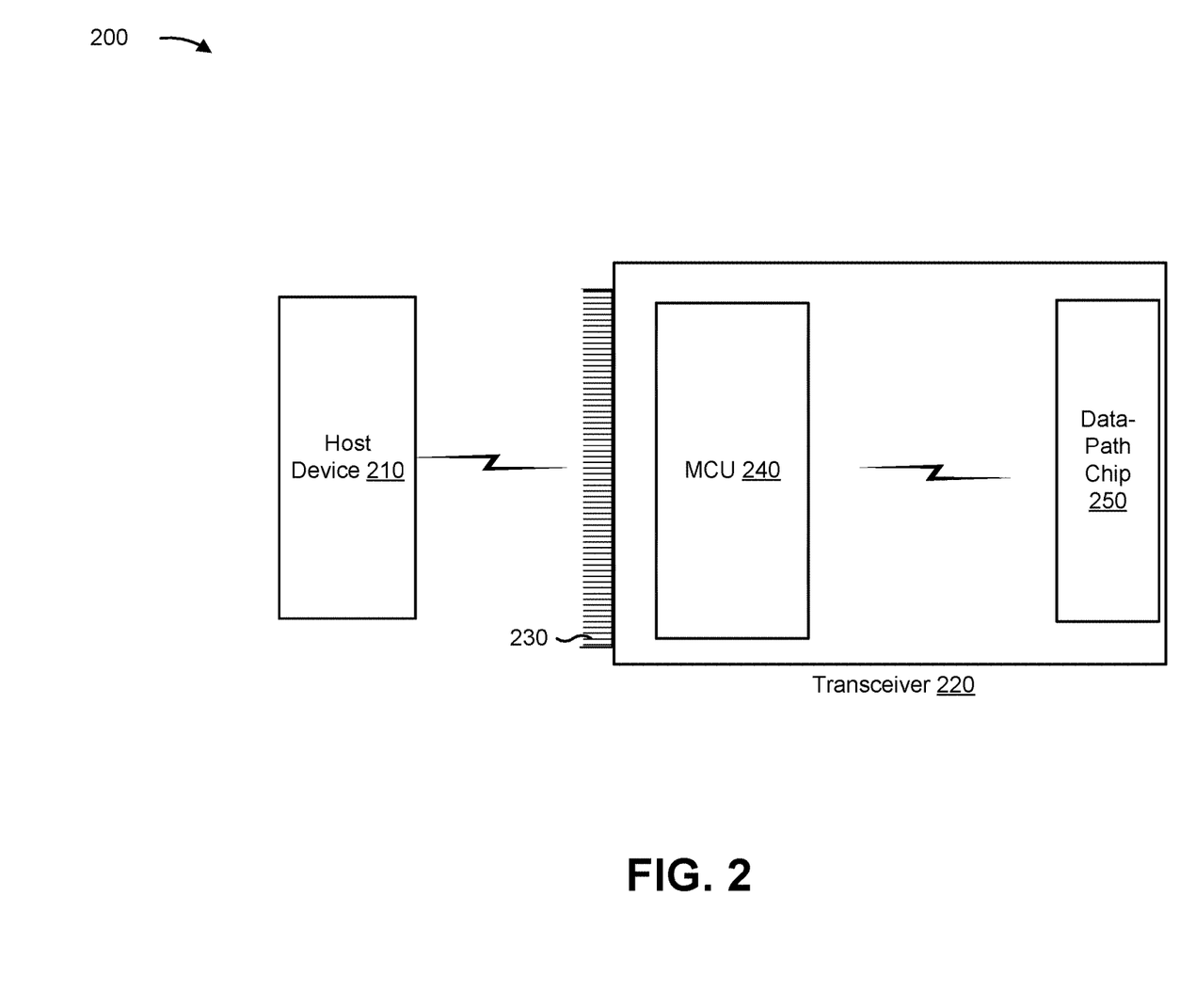
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a host device 210 and a transceiver 220. As further shown in FIG. 2, transceiver 220 may include a set of connectors 230, an MCU 240, and a data-path chip 250. Devices of environment 200 may interconnect via wired connections, wireless connections, or a combination of wired and wireless connections.

Host device 210 includes one or more devices capable of receiving, generating, storing, processing, and/or providing messages and/or data described herein. For example, host device 210 may include a user device (e.g., a mobile phone, a laptop computer, a tablet computer, a gaming device, a wearable communication device, a desktop computer, and/or the like), a server device (e.g., a server in a data center or a cloud computing environment, a data center, a workstation computer, a virtual machine (VM) provided in a cloud computing environment, and/or the like), or a similar type of device. In some implementations, host device 210 may provide a first set of messages and a second set of messages (e.g., that includes data) to MCU 240, as described elsewhere herein. Additionally, or alternatively, host device 210 may receive a readback of the data from MCU 240, as described elsewhere herein.

Transceiver 220 includes one or more devices capable of receiving, generating, storing, processing, and/or providing messages and/or data described herein. For example, transceiver 220 may include an electrical transceiver and/or an optical transceiver, such as a ten gigabit small form factor pluggable (XFP) transceiver, a ten gigabit serial electrical interface (XFI) transceiver, a small form factor pluggable (SFP) transceiver (e.g., including SFP plus (SFP+) transceivers and/or other similar types of transceivers), a quad small form factor pluggable (QSFP) transceiver (e.g., including a QSFP plus (QSFP+) transceiver, a QSFP double density (QSFP-DD) transceiver, and/or other similar types of transceivers), an octal small format pluggable (OSFP) transceiver, a consortium for on-board optics (COBO) transceiver, or a similar type of device. In some implementations, transceiver 220 may receive various sets of messages from host device 210, as described elsewhere herein. Additionally, or alternatively, transceiver 220 may provide, to host device 210, a readback of data included in the various sets of messages, as described elsewhere herein.

The set of connectors 230 includes one or more elements of transceiver 220 capable of connecting host device 210 and transceiver 220 (e.g., electrically and/or mechanically connecting host device 210 and transceiver 220, connecting host device 210 and transceiver 220 for a data transfer, and/or the like). For example, the set of connectors 230 may include a set of pin connectors, a set of finger connectors, a set of edge connectors, or a similar type of element. In some implementations, the set of connectors 230 may be associated with a physical wire interface (e.g., an external communications interface) via which various messages are received, as described elsewhere herein. In some implementations, the set of connectors 230 may mate with a socket of host device 210. In some implementations, the host device 210 may include the set of connectors 230, and transceiver 220 may include the socket.

MCU 240 includes one or more components capable of receiving, generating, storing, processing, and/or providing messages and/or data described herein. For example, MCU 240 includes a microcontroller, an integrated circuit, or a similar type of component. In some implementations, MCU 240 may additionally include a central processing unit (CPU), memory, and/or the like. In some implementations, MCU 240 may receive various sets of messages from host device 210, as described elsewhere herein. Additionally, or alternatively, MCU 240 may provide data to data-path chip 250, as described elsewhere herein.

Data-path chip 250 includes one or more components capable of receiving, generating, storing, processing, and/or providing messages and/or data described herein. For example, data-path chip 250 includes a digital signal processor (DSP), a microprocessor, or a similar type of component. In some implementations, data-path chip 250 may receive data from MCU 240, as described elsewhere herein. Additionally, or alternatively, data-path chip 250 may provide a readback of data to MCU 240, as described elsewhere herein.

The number and arrangement of devices shown in FIG. 2 are provided as one or more examples. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
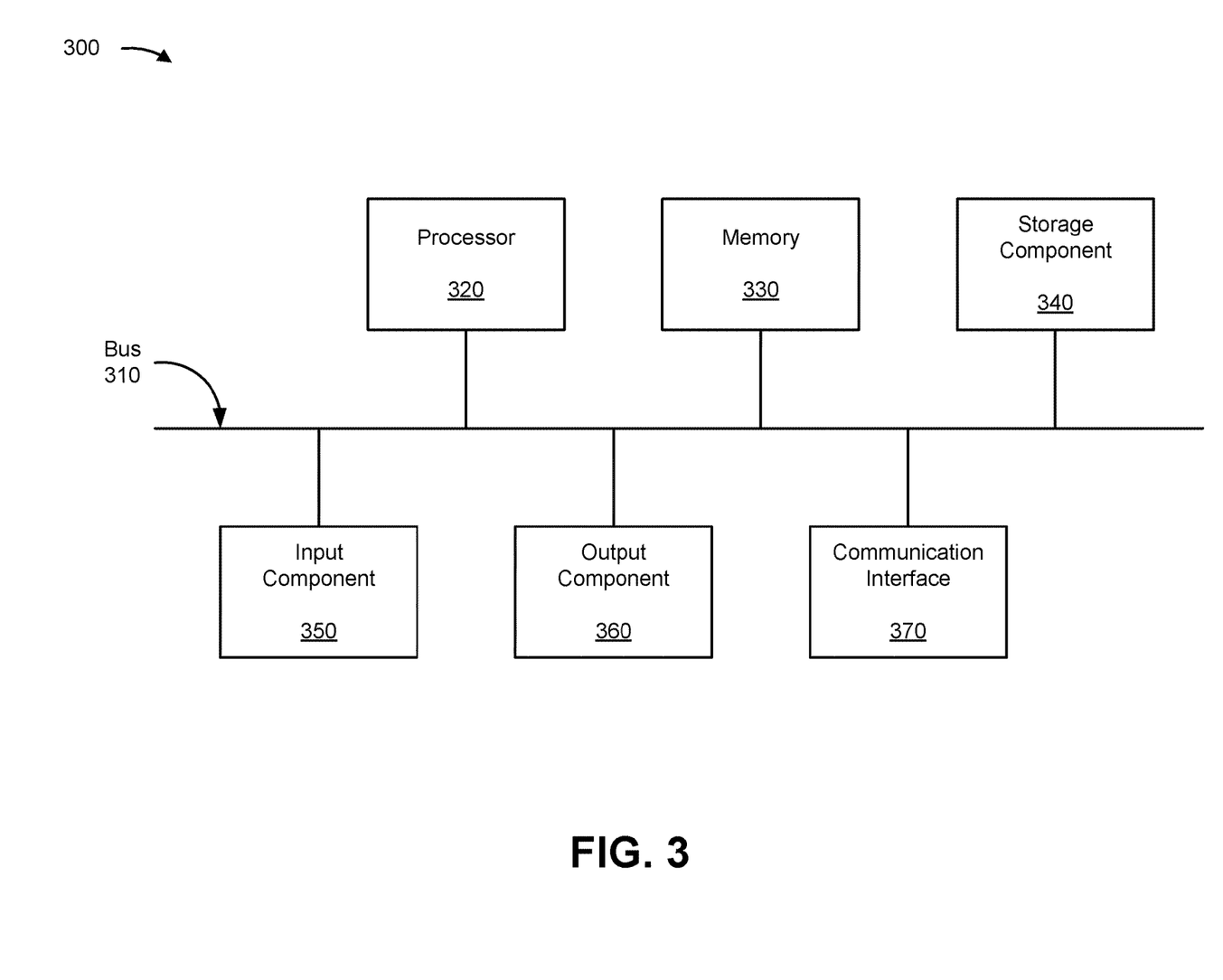
FIG. 3 is a diagram of example components of one or more devices of FIG. 2.

FIG. 3 is a diagram of example components of a device 300. Device 300 may correspond to host device 210 and/or transceiver 220. In some implementations, host device 210 and/or transceiver 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a CPU, a graphics processing unit (GPU), an accelerated processing unit (APU), a microprocessor, a microcontroller, a DSP, a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
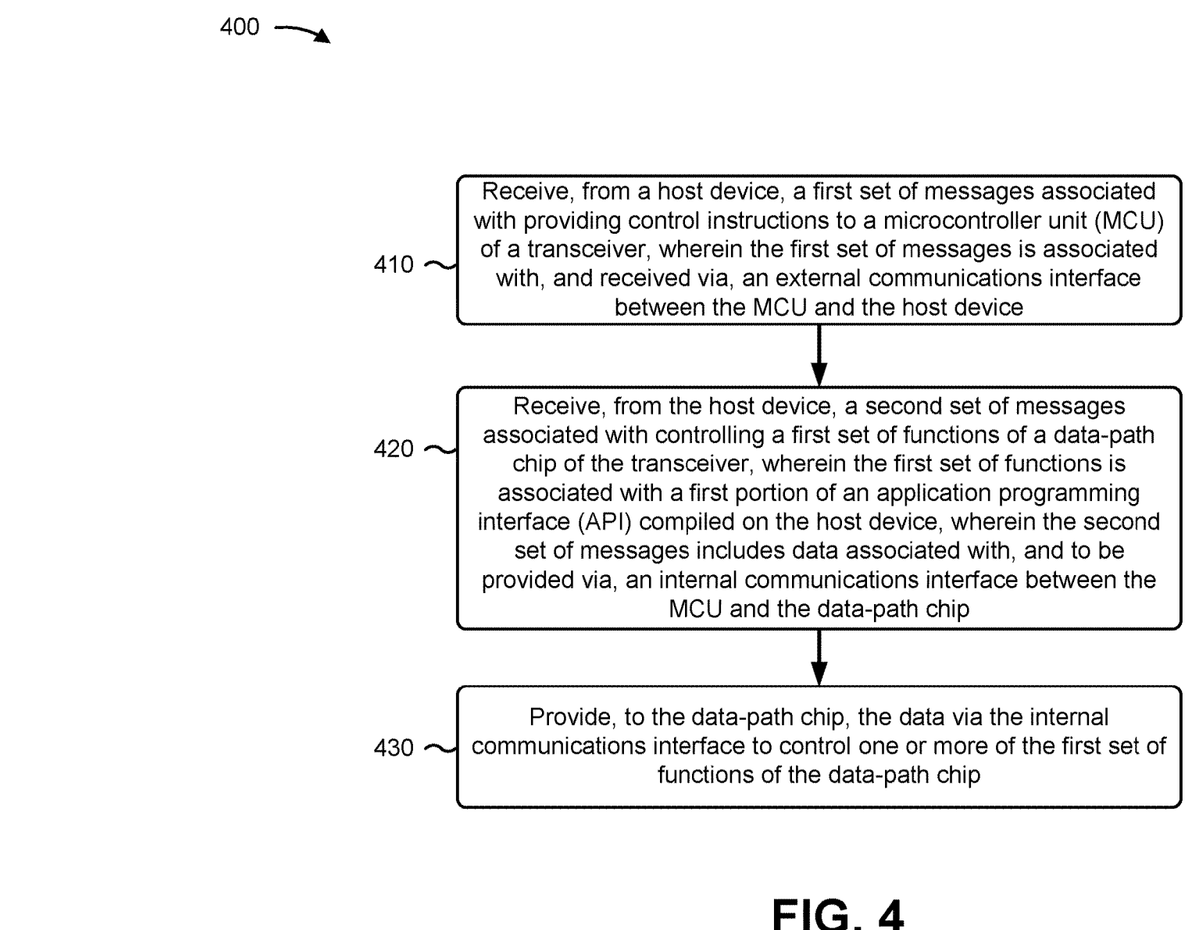
FIG. 4 is a flow chart of an example process for tunneling data to a data-path chip via a microcontroller unit (MCU).

FIG. 4 is a flow chart of an example process 400 for tunneling data to a data-path chip via a microcontroller unit (MCU). In some implementations, one or more process blocks of FIG. 4 may be performed by a transceiver (e.g., transceiver 220). In some implementations, one or more process blocks of FIG. 4 may be performed by another device or a group of devices separate from or including the transceiver, such as a host device (e.g., host device 210).

As shown in FIG. 4, process 400 may include receiving, from a host device, a first set of messages associated with providing control instructions to an MCU of a transceiver, wherein the first set of messages is associated with, and received via, an external communications interface between the MCU and the host device (block 410). For example, the transceiver (e.g., using a set of connectors 230, MCU 240, processor 320, communication interface 370, and/or the like) may receive, from a host device, a first set of messages associated with providing control instructions to an MCU of a transceiver, as described above. In some implementations, the first set of messages is associated with, and received via, an external communications interface between the MCU and the host device.

As further shown in FIG. 4, process 400 may include receiving, from the host device, a second set of messages associated with controlling a first set of functions of a data-path chip of the transceiver, wherein the first set of functions is associated with a first portion of an API compiled on the host device, wherein the second set of messages includes data associated with, and to be provided via, an internal communications interface between the MCU and the data-path chip (block 420). For example, the transceiver (e.g., using a set of connectors 230, MCU 240, processor 320, communication interface 370, and/or the like) may receive, from the host device, a second set of messages associated with controlling a first set of functions of a data-path chip of the transceiver, as described above. In some implementations, the first set of functions is associated with a first portion of an API compiled on the host device. In some implementations, the second set of messages includes data associated with, and to be provided via, an internal communications interface between the MCU and the data-path chip.

As further shown in FIG. 4, process 400 may include providing, to the data-path chip, the data via the internal communications interface to control one or more of the first set of functions of the data-path chip (block 430). For example, the transceiver (e.g., using MCU 240, data-path chip 250, processor 320, communication interface 370, and/or the like) may provide, to the data-path chip, the data via the internal communications interface to control one or more of the first set of functions of the data-path chip, as described above.

Process 400 may include additional implementations, such as any single implementation or any combination of implementations described below and/or in connection with one or more other processes described elsewhere herein.

In some implementations, the first set of messages includes at least one message associated with writing a control page to the MCU, or at least one message associated with writing a control structure for the data to the MCU. In some implementations, the second set of messages includes at least one message associated with indicating an upcoming transfer of the data, or at least one message associated with writing the data to the data-path chip.

In some implementations, the transceiver may provide a third set of messages to the host device to perform a readback of the data to the host device. In some implementations, the first set of messages and the second set of messages are associated with a first protocol associated with the external communications interface, and the data is associated with a second protocol associated with the internal communications interface, the first protocol and the second protocol being different.

In some implementations, the transceiver may change a page register value for a data page associated with transferring the data to the data-path chip after receiving the first set of messages, may count a quantity of bytes of the data transferred to the data-path chip, and may change the page register between receiving messages of the second set of messages. In some implementations, the transceiver may write the data to the internal communications interface to cause the data to be provided to the data-path chip.

Additionally, or alternatively, a process described herein may include receiving, from a host device, a first set of messages and a second set of messages associated with controlling a first set of functions of a data-path chip of a transceiver, wherein the first set of functions is associated with a first portion of an API compiled on the host device, wherein the first set of functions is different than a second set of functions of the data-path chip associated with a second portion of the API compiled on the MCU, wherein the second set of messages includes data associated with, and to be provided via, an internal communications interface between the MCU and the data-path chip. For example, the transceiver (e.g., using a set of connectors 230, MCU 240, processor 320, communication interface 370, and/or the like) may receive, from a host device, a first set of messages and a second set of messages associated with controlling a first set of functions of a data-path chip of a transceiver, as described above. In some implementations, the first set of functions is associated with a first portion of an application programming interface (API) compiled on the host device. In some implementations, the first set of functions is different than a second set of functions of the data-path chip associated with a second portion of the API compiled on the MCU. In some implementations, the second set of messages includes data associated with, and to be provided via, an internal communications interface between the MCU and the data-path chip.

Such a process may include providing, by the MCU and to the data-path chip, the data in the second set of messages via the internal communications interface to control one or more of the first set of functions of the data-path chip. For example, the transceiver (e.g., using MCU 240, data-path chip 250, processor 320, communications interface 370, and/or the like) may provide, by the MCU and to the data-path chip, the data in the second set of messages via the internal communications interface to control one or more of the first set of functions of the data-path chip, as described above.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a microcontroller unit (MCU) of a transceiver and from a host device, a first set of messages providing control instructions to the MCU,
      wherein the first set of messages is received via an external communications interface between the MCU and the host device;
   receiving, by the MCU and from the host device, a second set of messages including data to control a first set of functions of a data-path chip of the transceiver,
      wherein the first set of functions is defined by a first portion of an application programming interface (API) compiled on the host device,
         the API defining a plurality of functions for controlling the data-path chip,
         the first set of functions are included in the plurality of functions for controlling the data-path chip, and
         the first portion of the API, as compiled on the host device, is different from a second portion of the API, as compiled on the MCU,
            the second portion of the API defining second functions of the plurality of functions for controlling the data-path chip, and
      wherein the second set of messages includes information identifying, and to be provided via, an internal communications interface between the MCU and the data-path chip; and
   providing, by the MCU and to the data-path chip, the data via the internal communications interface to control one or more of the first set of functions.

2. The method of claim 1, wherein the first set of messages includes:
   at least one message for writing a control page to the MCU, or
   at least one message for writing a control structure for the data to the MCU.

3. The method of claim 1, wherein the second set of messages includes:
   at least one message indicating an upcoming transfer of the data, or
   at least one message for writing the data to the data-path chip.

4. The method of claim 1, further comprising:
   providing a third set of messages to the host device to perform a readback of the data to the host device or to provide, to the host device, other data stored by the data-path chip.

5. The method of claim 1, wherein the first set of messages and the second set of messages conform to a first protocol used by the external communications interface,
   wherein the data conforms to a second protocol used by the internal communications interface.

6. The method of claim 1, further comprising:
changing a page register value for a data page associated with transferring the data to the data-path chip, after receiving the first set of messages;
counting a quantity of bytes of the data transferred to the data-path chip; and
changing the page register value between receiving messages of the second set of messages.

7. The method of claim 1, wherein providing the data comprises:
writing the data to the internal communications interface to cause the data to be provided to the data-path chip.

8. A transceiver, comprising:
a set of connectors;
a microcontroller unit (MCU); and
a data-path chip,
wherein the MCU and a device are connected via an external communications interface connected to the set of connectors,
wherein the MCU and the data-path chip are connected via an internal communications interface that is different than the external communications interface,
wherein a first portion of an application programming interface (API) is compiled on the device,
the API defining a plurality of functions for controlling the data-path chip, and
the first portion of the API defining first functions of the plurality of functions for controlling the data-path chip, and
wherein the first portion of the API, as compiled on the device, is different than a second portion of the API, as compiled on the MCU,
the second portion of the API defining second functions of the plurality of functions for controlling the data-path chip,
wherein the MCU is configured to:
receive, on the external communications interface and from the device, a set of messages,
wherein the set of messages includes information identifying the internal communications interface and data to control the first functions; and
provide, to the data-path chip and via the internal communications interface, the data to control the first functions after receiving the set of messages.

9. The transceiver of claim 8, wherein the set of connectors includes at least one of:
a set of pin connectors,
a set of finger connectors, or
a set of edge connectors.

10. The transceiver of claim 8, wherein the external communications interface includes a single wire interface or a multi-wire interface.

11. The transceiver of claim 8, wherein the internal communications interface includes at least one of:
a serial peripheral interface (SPI),
an inter-integrated circuit (I2C) interface,
a management data input/output (MDIO) interface, or
a two-wire interface.

12. The transceiver of claim 8, wherein the transceiver is an optical transceiver.

13. The transceiver of claim 8, wherein the data-path chip is a digital signal processor (DSP).

14. The transceiver of claim 8, wherein the MCU is further configured to perform a readback of the data to the device or to provide, to the device, other data stored by the data-path chip.

15. A system, comprising:
a host device that compiles a first portion of an application programming interface (API); and
a transceiver, comprising:
a microcontroller unit (MCU) that compiles a second portion of the API,
wherein the second portion of the API is different than the first portion of the API,
wherein the API defines a plurality of functions for controlling a data-path chip of the transceiver,
wherein the first portion of the API defines a first set of functions of the plurality of functions for controlling the data-path chip,
wherein the second portion of the API defines a second set of functions of the plurality of functions for controlling the data-path chip,
wherein the first set of functions and the second set of functions are different, and
wherein the MCU is configured to provide controls and data received from the host device via the first portion of the API, through the MCU without operating on the controls and the data and without using the second portion of the API.

16. The system of claim 15, wherein the host device and the MCU are connected via an external communications interface, and
wherein the external communications interface includes a physical wire interface and a first protocol.

17. The system of claim 16, wherein the MCU and the data-path chip are connected via an internal communications interface, and
wherein the internal communications interface includes the physical wire interface and a second protocol that is different than the first protocol.

18. The system of claim 15, wherein the MCU is further configured to receive a first set of messages associated with providing the controls to the data-path chip prior to providing the data to the data-path chip.

19. The system of claim 18, wherein the MCU is further configured to receive, after the first set of messages, a second set of messages that includes the data to be provided to the data-path chip.

20. The system of claim 15, wherein the MCU is further configured to provide a readback of the data after providing the data to the data-path chip or to provide, to the host device, other data stored by the data-path chip.

* * * * *